US006282878B1

(12) United States Patent
Hill

(10) Patent No.: US 6,282,878 B1
(45) Date of Patent: Sep. 4, 2001

(54) PRODUCE CATCHER

(75) Inventor: Daryl G. Hill, Yakima, WA (US)

(73) Assignee: Orchard-Rite Ltd., Inc., Union Gap, WA (US)

( * ) Notice: Subject to any disclaimer, the term of this patent is extended or adjusted under 35 U.S.C. 154(b) by 0 days.

(21) Appl. No.: 09/458,798

(22) Filed: Dec. 10, 1999

(51) Int. Cl.$^7$ .................................................. A01D 46/24
(52) U.S. Cl. ............................................................... 56/329
(58) Field of Search ................................. 56/328.1, 329, 56/340, 330

(56) References Cited

U.S. PATENT DOCUMENTS

| | | | |
|---|---|---|---|
| 1,371,999 | * | 3/1921 | Allshouse ................................ 56/329 |
| 3,250,065 | * | 5/1966 | Frost ....................................... 56/329 |
| 3,548,579 | * | 12/1970 | Shipley, Jr. ............................. 56/329 |
| 3,608,292 | * | 9/1971 | Perry ....................................... 56/329 |
| 3,739,561 | * | 6/1973 | Boudeman ............................. 56/329 |
| 3,896,612 | * | 7/1975 | McHugh et al. ........................ 56/329 |
| 4,573,310 | * | 3/1986 | Friedel ..................................... 56/329 |
| 4,702,065 | * | 10/1987 | Littau ...................................... 56/329 |
| 5,875,625 | * | 3/1999 | Pavone .................................... 56/329 |

OTHER PUBLICATIONS

Friday Tractor Co., Inc. "Friday Self–Propelled Half–Rollout Trunk Harvester" brochure. (no date).

* cited by examiner

Primary Examiner—Robert E. Pezzuto
(74) Attorney, Agent, or Firm—Stratton Ballew PLLC

(57) ABSTRACT

A produce catcher is provided that includes a support frame having a support member, a first extending arm and a second extending arm. The first extending arm is substantially parallel to and extendible from the support member, and the second extending arm is substantially parallel to and extendible from the support member. The first extending arm extends in a direction substantially opposite from the extension of the first extending member. A first tarp pole pivotally attaches to the first extending member and a second tarp pole is affixed to the support member. A third tarp pole pivotally attaches to the second extending member, and a fourth tarp pole is also affixed to the support member. The second tarp pole and the fourth tarp pole are spaced apart from one another at a distance sufficient to allow the positioning of a trunk of a tree between the second tarp pole and the fourth tarp pole. A first tarp is adapted to be suspended between the first tarp pole and the second tarp pole. Similarly, a second tarp is adapted to be suspended between the third tarp pole and the fourth tarp pole. Produce falling from the tree is received on the first or second tarp. The produce catcher can be attached to a forklift, a forklift attachment on a tractor, or equivalent motivation means. Damage to produce is minimized, and the manual gathering of the produce after it has fallen is eliminated.

18 Claims, 9 Drawing Sheets

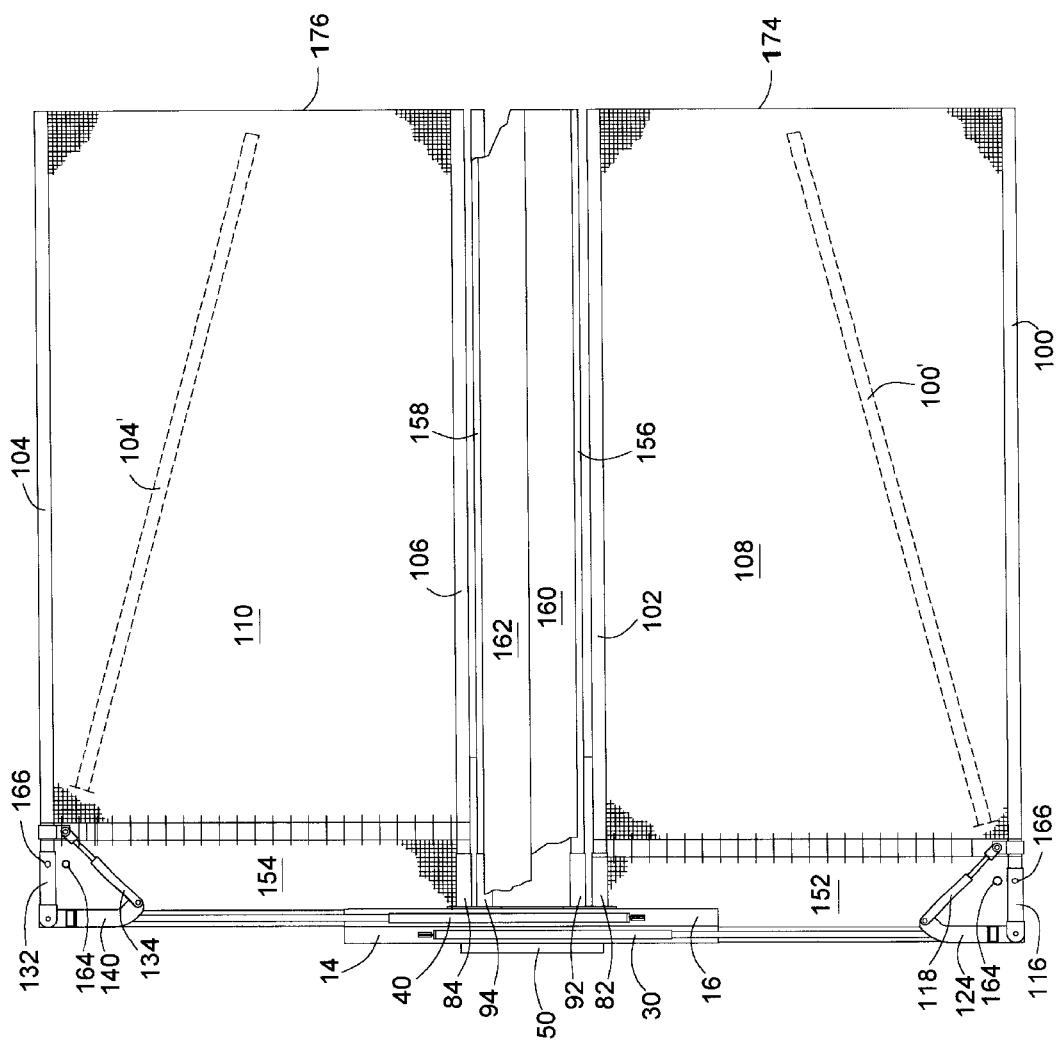
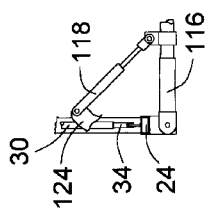

PRODUCE CATCHER

TECHNICAL FIELD

The invention relates to the field of agricultural implements. Specifically, the invention relates to a device for collecting produce as it is harvested.

BACKGROUND OF THE INVENTION

In the fruit and nut growing industries, it is desirable to harvest crops mechanically to minimize crop damage and increase efficiency, thus lowering costs and increasing profits to the grower. One mechanical harvesting device that has been used successfully for harvesting certain varieties of fruits and nuts, hereinafter referred to simply as produce, is the tree shaker. Typically, tree shaker-type harvesters include a means for applying a shaking force to a tree. The shaking force causes the produce to drop from the tree onto the ground, where it is then gathered and placed into bins. A disadvantage of this method of harvesting produce is that the produce must fall a substantial distance, and may be bruised or otherwise damaged in the process. A further disadvantage of this method of harvesting produce is the need for manually gathering the produce after it has fallen, and placing it on a conveyor or in a bin.

Attempts have been made to solve the problem described above by providing a device for catching the produce as it falls. However, all of the devices known to date are complex and costly to build, operate and maintain. It would be useful, therefore, to have a device for catching produce as it falls from a tree, which is inexpensive to build, operate and maintain.

SUMMARY OF INVENTION

The present invention provides a produce catcher. The produce catcher includes a support frame having a support member, a first extending arm and a second extending arm. The the first extending arm is substantially parallel to and extendible from the support member, and the second extending arm is substantially parallel to and extendible from the support member. The first extending arm extends in a direction substantially opposite from the extension of the first extending member. A first tarp pole pivotally attaches to the first extending member and a second tarp pole is affixed to the support member. A third tarp pole pivotally attaches to the second extending member, and a fourth tarp pole is also affixed to the support member. The second tarp pole and the fourth tarp pole are spaced apart from one another at a distance sufficient to allow the positioning of a trunk of a tree between the second tarp pole and the fourth tarp pole.

The produce catcher further includes a first tarp adapted to be suspended between the first tarp pole and the second tarp pole. Similarly, a second tarp is adapted to be suspended between the third tarp pole and the fourth tarp pole. Produce falling from the tree is received on the first or second tarp.

The produce catcher can be attached to a forklift, a forklift attachment on a tractor, or equivalent motivation means.

The present invention has the advantage of minimizing damage to produce falling from the tree. An additional advantage of the present invention is that it eliminates the need for manually gathering the produce after it has fallen, and provides for the transfer of the produce to a conveyor or bin.

A further advantage of the present invention is that it provides a produce catcher which can be economically built, operated and maintained.

BRIEF DESCRIPTION OF DRAWINGS

FIG. 5 is a top plan view of a produce catcher of the present invention;

FIG. 5A is a partial top plan view of a produce catcher of the present invention;

DETAILED DESCRIPTION OF SPECIFIC EMBODIMENTS

The produce catcher 2 of the present invention is adapted for use with a conventional forklift, or with a forklift attachment on a typical orchard tractor or other suitable vehicle 4 having a first fork 6 and a second fork 8. The produce catcher may also be adapted for use with any motivation source capable of raising, lowering and tilting the produce catcher, and providing hydraulic power thereto. The produce catcher is preferably constructed primarily of steel components, although where appropriate, other materials could be used.

Figure 1:
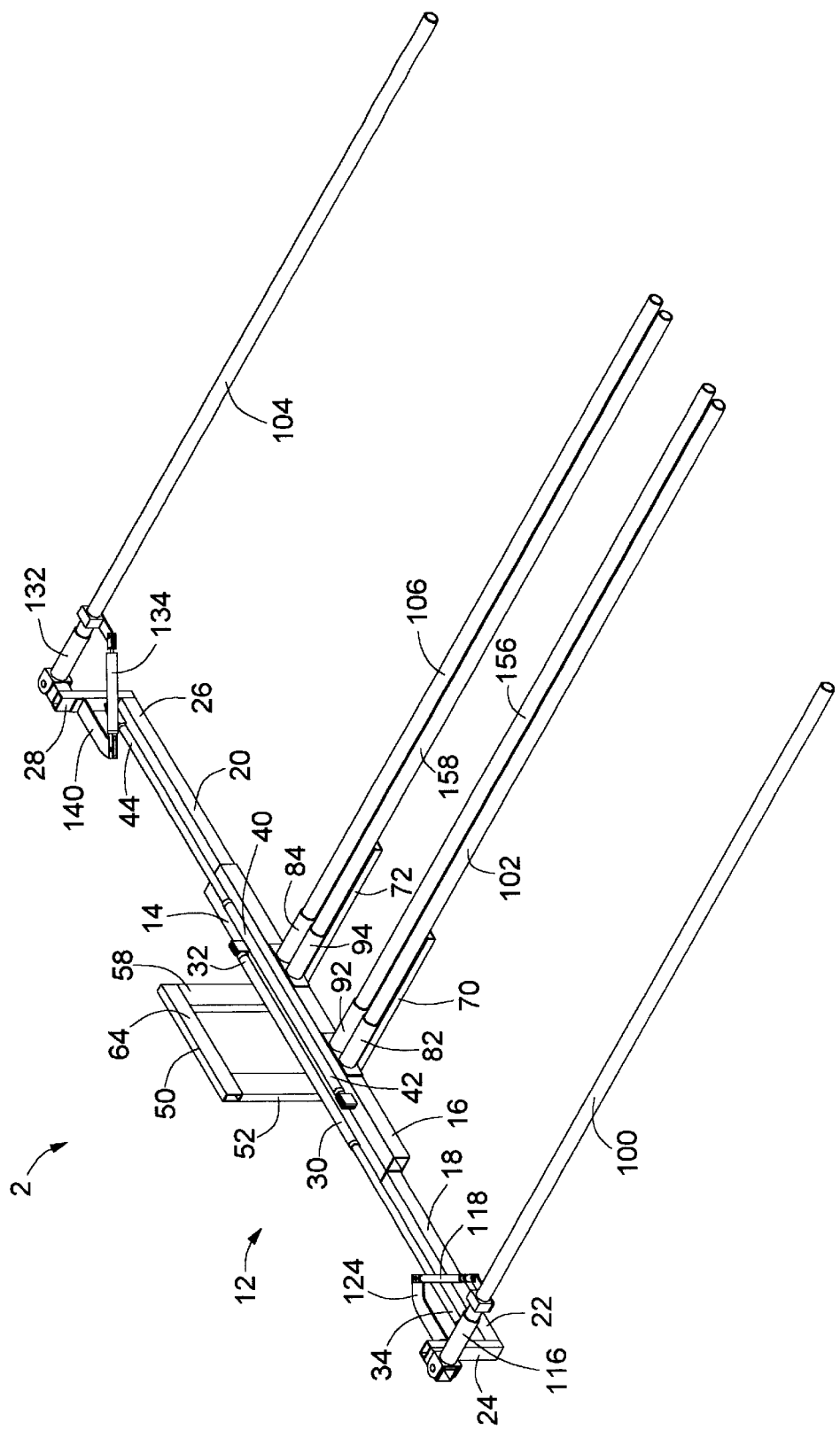
FIG. 1 is a perspective view of a produce catcher of the present invention, shown in an extended position with the produce catching tarp removed.
Figure 2:
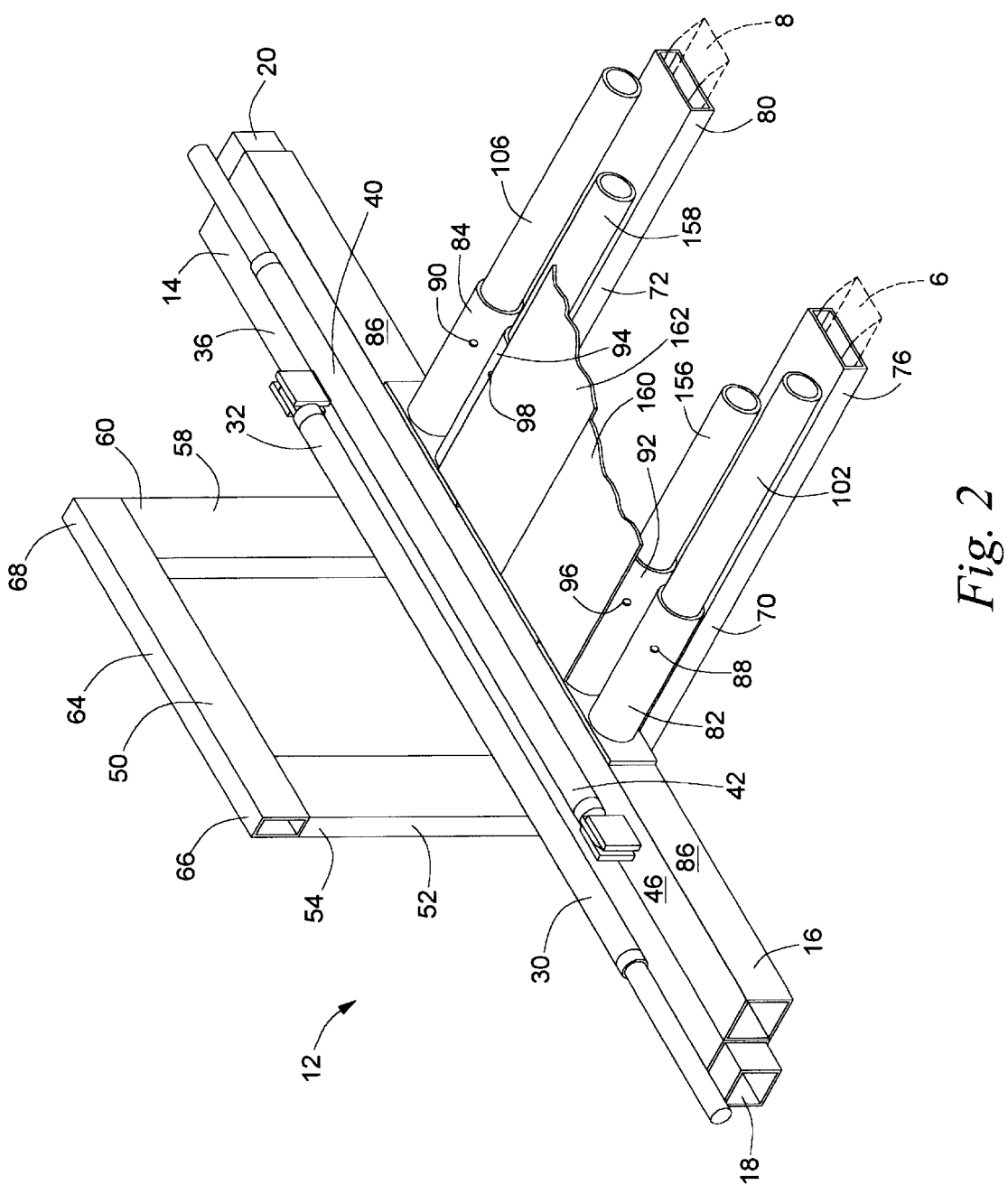
FIG. 2 is a partial perspective view of a produce catcher of the present invention, detailing the support frame.

The produce catcher 2 includes a support frame 12 having a horizontal first support member 14 and a horizontal second support member 16, as shown in FIGS. 1–8 and detailed in FIG. 2. In a preferred embodiment, each support member is hollow and approximately square in cross section, having four substantially flat sides, although other configurations may also be used, such as round or rectangular. The first support member and the second support member are joined together, so that the first and second support members are positioned parallel to one another in side by side relation. In a preferred embodiment, the first support member and second support member are welded together. In an alternative preferred embodiment, a single support member is provided in place of the first support member 14 and the second support member 16.

The support frame 12 further includes a horizontal first extending arm 18 and a horizontal second extending arm 20. The first extending arm has a distal end 22, to which is attached a first vertical end member 24. The first extending arm is slidably received in the hollow interior of the first support member 14. Similarly, the second extending arm 20 has a distal end 26, to which is attached a second vertical end member 28. The second extending arm is slidably received in the hollow interior of the second support member 16.

Figure 6:
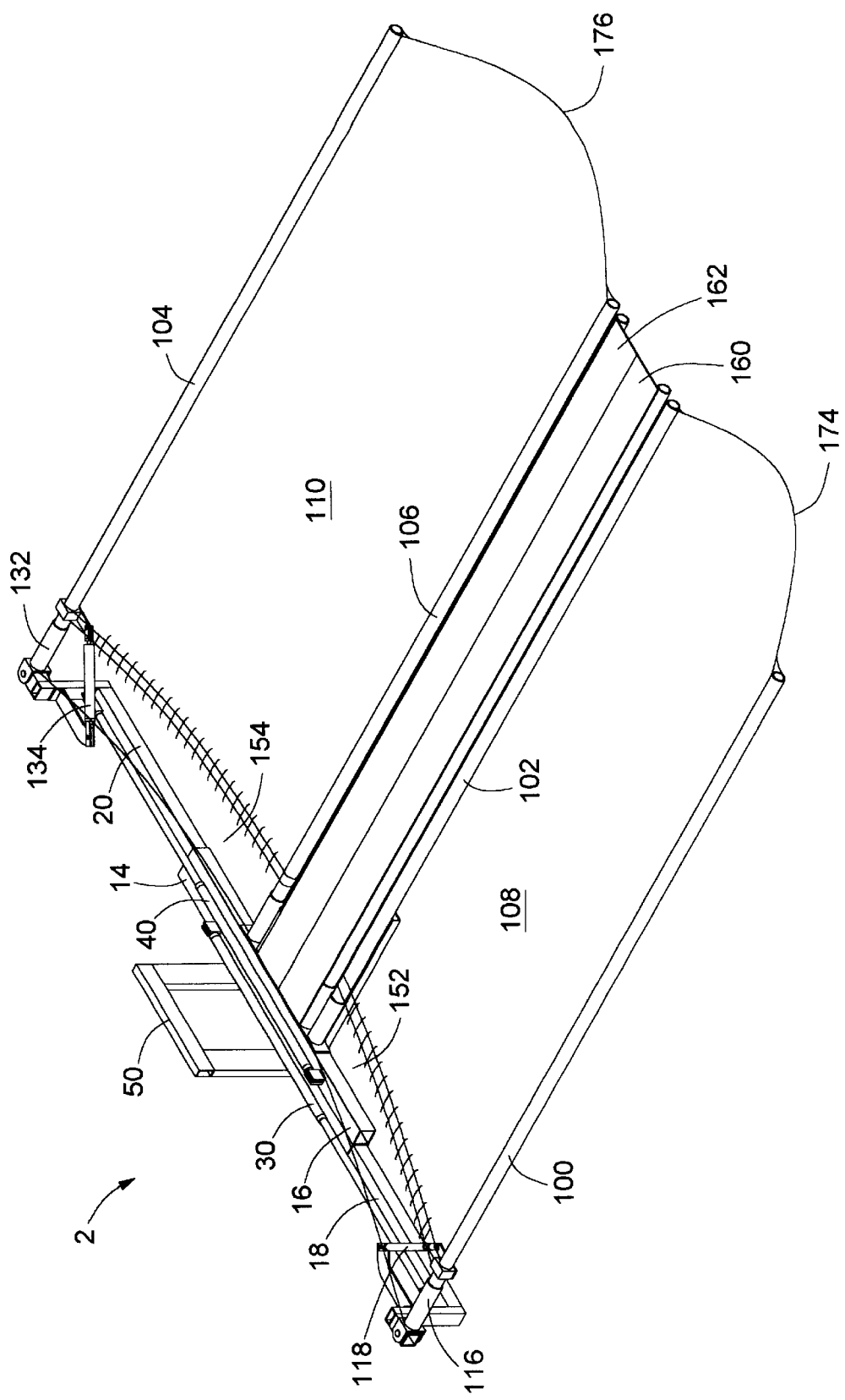
FIG. 6 is a perspective view of a produce catcher of the present invention, shown in an extended position.
Figure 7:
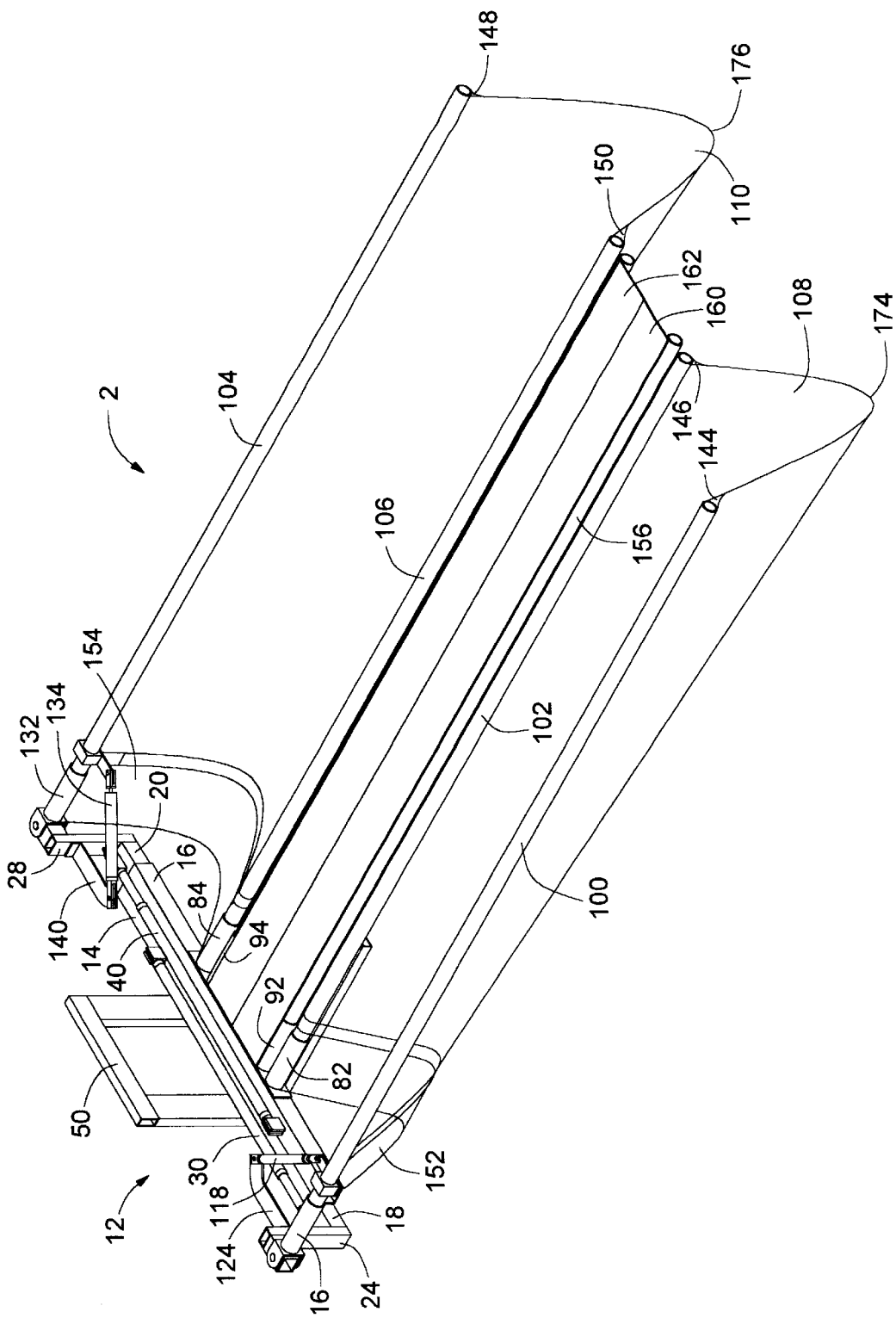
FIG. 7 is a perspective view of a produce catcher of the present invention, shown in a retracted position.

In the preferred embodiment shown in FIGS. 5, 6, and 7, a first hydraulic actuator 30 is provided on the support frame for extending and retracting the first extending arm 18 relative to the first support member 14. The first hydraulic actuator has a first end 32 and a second end 34. In a preferred embodiment, the first end is pivotally attached to the upper surface 36 of the first support member, and the second end is pivotally attached to the first vertical end member 24 of the first extending arm, as shown in FIG. 5A.

Similarly, a second hydraulic actuator 40 is provided on the support frame for extending and retracting the second extending arm 20 relative to the second support member 16. The second hydraulic actuator has a first end 42 and a second end 44. In a preferred embodiment, the first end is pivotally attached to the upper surface 46 of the second support member, and the second end is pivotally attached to the second vertical end member 28 of the second extending arm. It is also contemplated that the first hydraulic actuator 30 and the second hydraulic actuator can be mounted on a lower surface of the support members.

In a preferred embodiment detailed in FIG. 2, a vertical brace 50 is provided on the support frame 12. The brace is affixed to the first support member 14. The brace helps to support the produce catcher 2 in a preferred position while engaged on the forks of a forklift or tractor for movement.

Preferably, the brace 50 includes a first upright member 52 having a first end 54 and a second end 56, a second upright member 58 having a first end 60 and a second end 62, and a horizontal member 64 having a first end 66 and a second end 68. The first end of the horizontal member is affixed to the first end of the first upright member, and the second end of the horizontal member is affixed to the first end of the second upright member, such that the first and second upright members are parallel to one another and perpendicular to the horizontal member.

Figure 3:
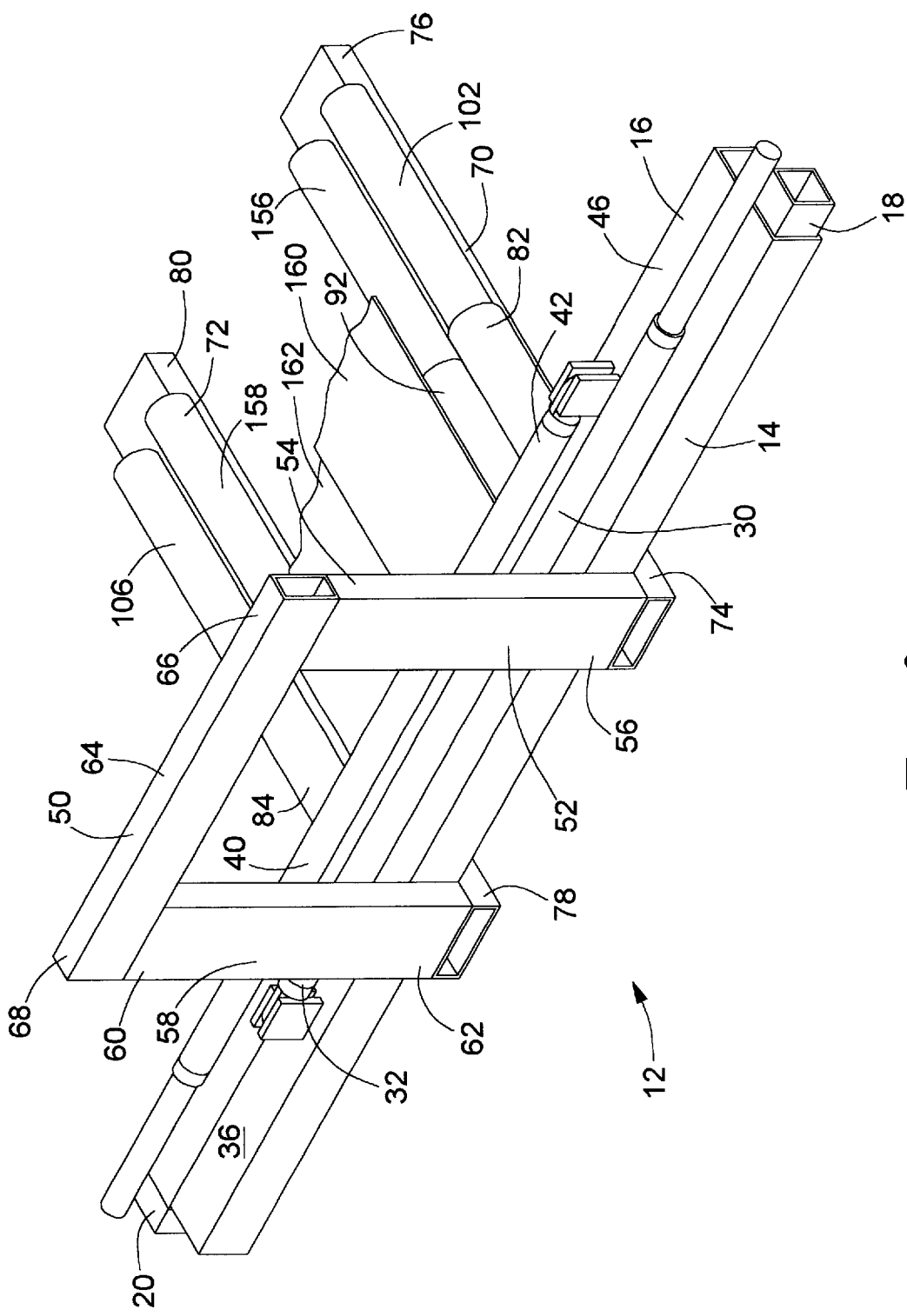
FIG. 3 is a partial perspective rear view of a produce catcher of the present invention, detailing the support frame.

As shown in FIGS. 2 and 3, the second end 56 of the first upright member 52 is preferably affixed to the first support member 14, and the second end 62 of the second upright member 58 is preferably affixed to the first support member, such that the first and second upright members are perpendicular to the first support member, and the horizontal member 64 and the first support member are parallel to one another. Most preferably, the brace 50 is welded to the first support member 14.

Figure 8:
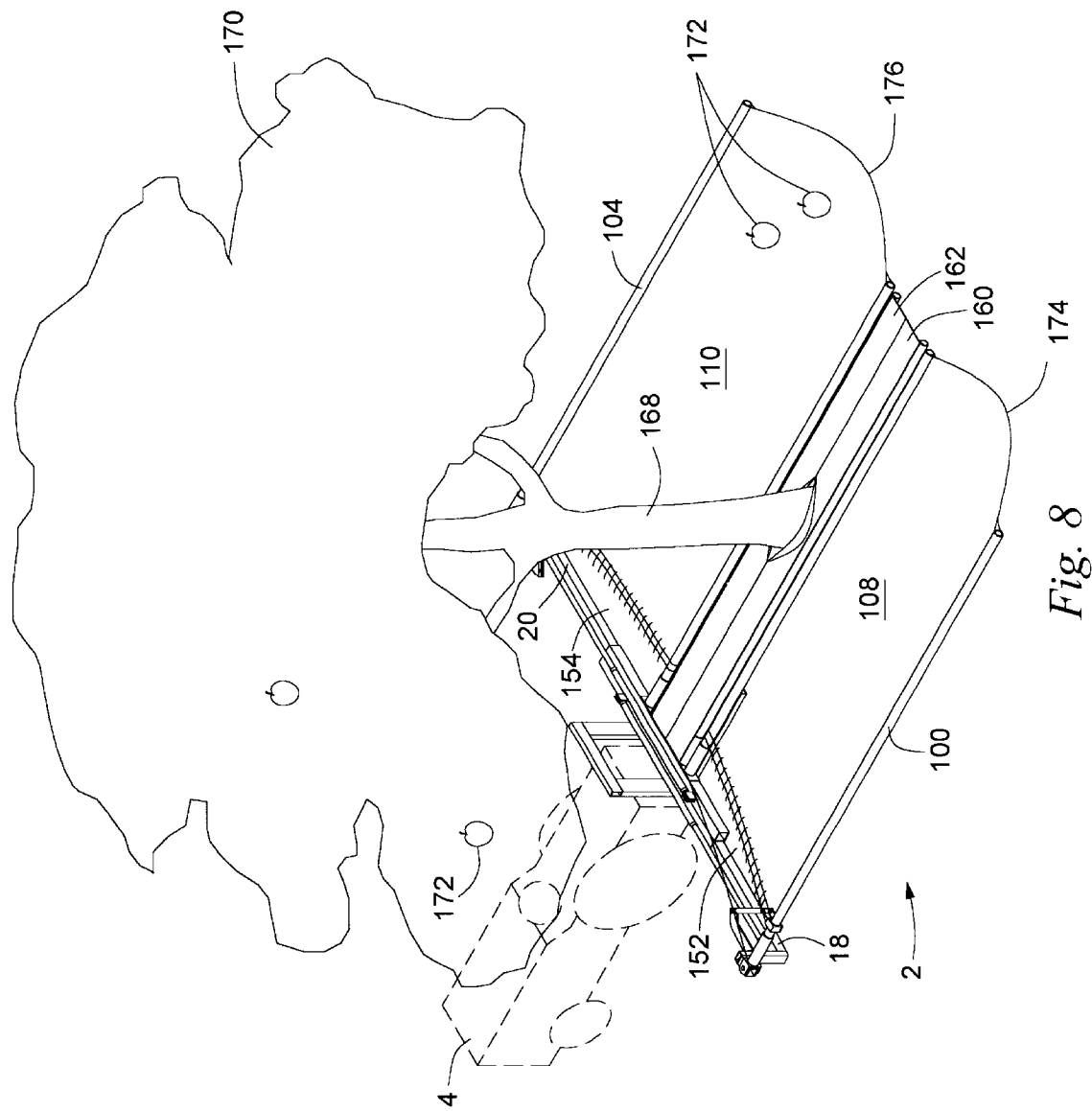
FIG. 8 is a perspective view of a produce catcher of the present invention, shown in position at the base of a tree.

The support frame 12 includes a device for removably attaching the produce catcher 2 to a motivation source, such as a forklift or forklift attachment on a vehicle 4, as shown in FIG. 8. In a preferred embodiment of the present invention, a first fork receiving sleeve 70 and a parallel second fork receiving sleeve 72 are provided for receiving the first fork 6 and the second fork 8 of the forklift or forklift attachment. The fork receiving sleeves are preferably rectangular in cross section, and are positioned in the horizontal plane perpendicular to the first support member 14 and the second support member 16. The first fork receiving sleeve 70 has a first end 74 and a second end 76, and the second fork receiving sleeve 72 has a first end 78 and a second end 80. The first end of the first fork receiving sleeve is affixed to the lower surfaces of the first and second support members;

similarly, the first end of the second fork receiving sleeve is affixed to the lower surfaces of the first and second support members. Preferably, the fork receiving sleeves are welded to the lower surfaces of the first and second support members.

The support frame 12 of the produce catcher 2 is additionally fitted with a plurality of sleeves, as best seen in FIG. 2. A first stationary tarp pole sleeve 82 and a second stationary tarp pole sleeve 84 are affixed to the forward facing surface 86 of the second support member 16, and extend outwardly and horizontally therefrom. The stationary tarp pole sleeves are spaced apart from one another, and equidistant from the ends of the second support member. In a preferred embodiment, each stationary tarp pole sleeve has at least one bolt hole 88 provided therein for receiving a bolt 90.

A first flange pole sleeve 92 and a second flange pole sleeve 94 are affixed to the forward facing surface 86 of the second support member 16, and extend outwardly and horizontally therefrom. The flange pole sleeves are spaced apart from one another, and equidistant from the ends of the second support member. Both the first and second flange pole sleeves are positioned between the stationary tarp pole sleeves 82 and 84. In a preferred embodiment, each flange pole sleeve has at least one bolt hole 96 provided therein for receiving a bolt 98.

In addition to the support frame 12, the produce catcher 2 of the present invention includes a first tarp pole 100, a second tarp pole 102, a third tarp pole 104, and fourth tarp pole 106. The first tarp pole is essentially attached to the first extending arm, and the third tarp pole is essentially attached to the second extending arm. The second and fourth tarp poles are attached to the support member.

The first tarp pole 100 and the second tarp pole 102 are spaced apart from and parallel to one another, and are adapted to receive a first tarp 108, as shown in FIGS. 5 through 8. The second tarp pole is removably received in the first stationary tarp pole sleeve 82. Likewise, the third tarp pole 104 and the fourth tarp pole 106 are spaced apart from and parallel to one another, and are adapted to receive a second tarp 110. The second tarp pole and the fourth tarp pole are spaced apart from one another a sufficient distance to allow the positioning of a tree trunk therebetween. The fourth tarp pole is removably received in the second stationary tarp pole sleeve 84. In a preferred embodiment, the tarps are made from conventional tarp material, such as canvas, reinforced vinyl, or the like. Alternatively, other fabric-like materials which are capable of supporting a substantial load without tearing or stretching, can be used for the tarps.

Figure 4A:
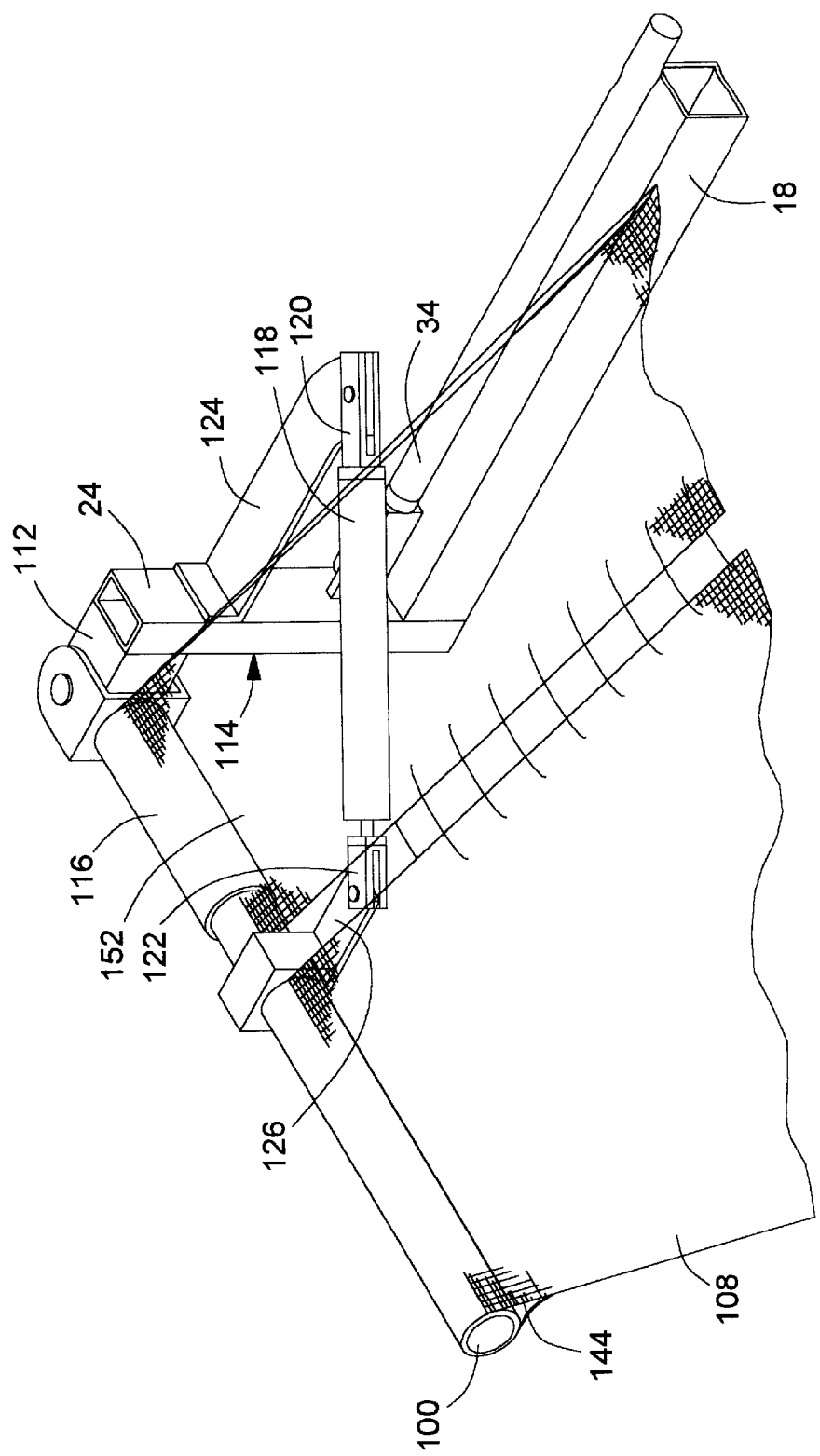
FIG. 4A is a partial perspective view of a produce catcher of the present invention.

The first tarp pole 100 essentially pivots about the distal end 22 of the first extending arm 18. In a preferred embodiment, a first mounting bracket 112 is provided on the first vertical end member 24 of the first extending arm 18, as shown in FIG. 4A. The first mounting bracket is affixed to a surface 114 of the first vertical end member. The mounting bracket is adapted to receive a first swiveling tarp pole sleeve 116. The first swiveling tarp pole sleeve rotates in a horizontal plane. The first tarp pole 100 is removably receivable in the first swiveling tarp pole sleeve.

As further detailed in FIG. 4A, a third hydraulic actuator 118 having a first end 120 and a second end 122 is provided for moving the first tarp pole 100. The first end of the third hydraulic actuator is pivotally attached to a first horizontal mounting bar 124 on the first vertical end member 24. The second end of the third hydraulic actuator is pivotally attached to a first mounting tab 126 which is preferably clamped to the first tarp pole.

Figure 4B:
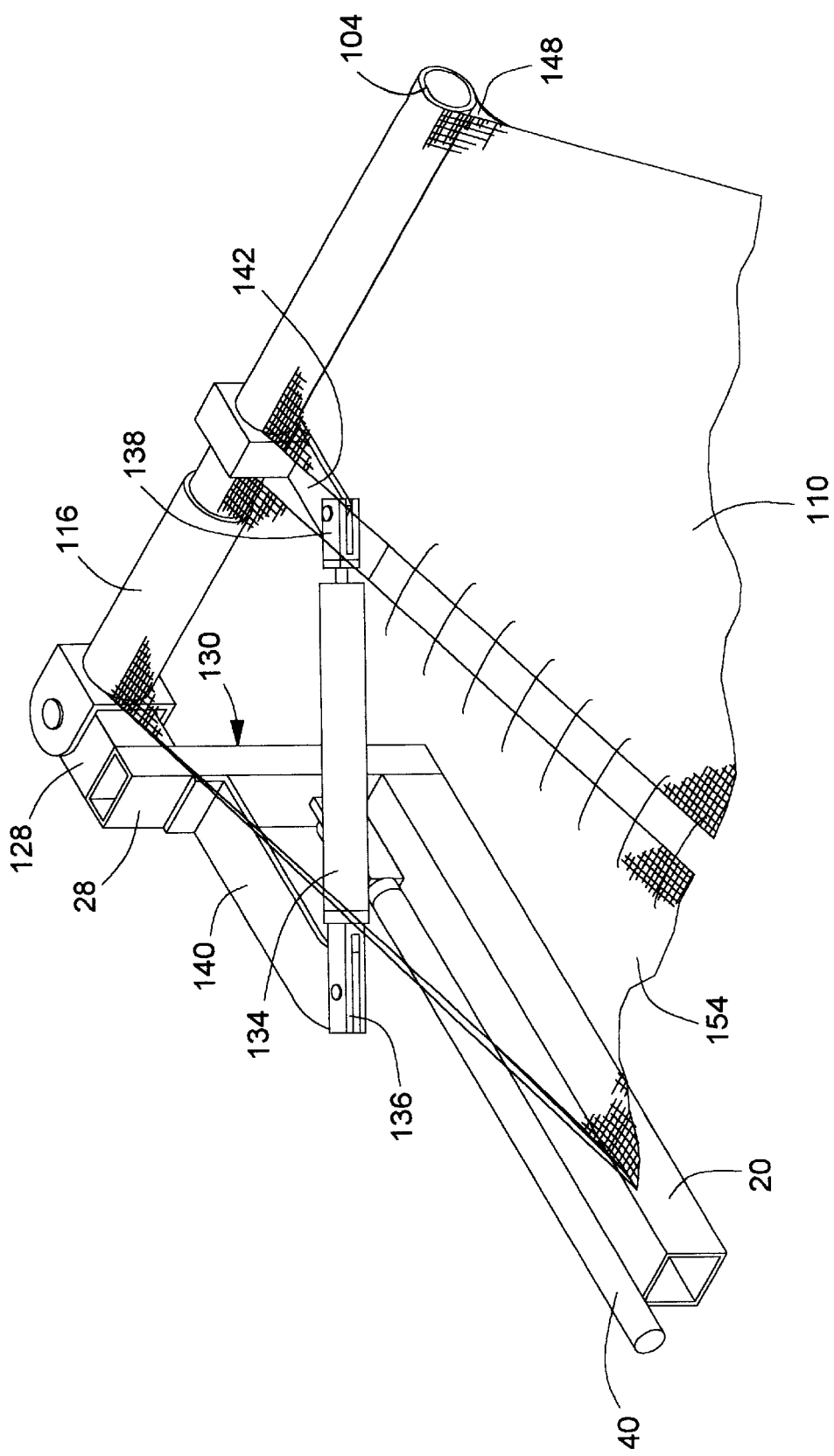
FIG. 4B is a partial perspective view of a produce catcher of the present invention.

The third tarp pole 104 essentially pivots about the distal end 26 of the second extending arm 20. In a preferred embodiment, a second mounting bracket 128 is provided on the second vertical end member 28 of the second extending arm 20, as shown in FIG. 4B. The second mounting bracket is affixed to a surface 130 of the first vertical end member. The mounting bracket is adapted to receive a first swiveling tarp pole sleeve 132. The second swiveling tarp pole sleeve rotates in a horizontal plane. The third tarp pole 104 is removably receivable in the second swiveling tarp pole sleeve.

As further detailed in FIG. 4B, a fourth hydraulic actuator 134 having a first end 136 and a second end 138 is provided for moving the third tarp pole 104. The first end of the fourth hydraulic actuator is pivotally attached to a second horizontal mounting bar 140 on the second vertical end member 28. The second end of the fourth hydraulic actuator is pivotally attached to a second mounting tab 142 which is preferably clamped to the third tarp pole.

The hydraulic actuators 30, 40, 118, and 134 of the produce catcher 2 are of the conventional type, and are controlled by the hydraulic system of the forklift or vehicle 4 with which the produce catcher is being used.

The first tarp 108 and the second tarp 110 are adapted to be removably received on the first and second tarp poles 100 and 102, and the third and fourth tarp poles 104 and 106, respectively, as shown in FIG. 7. In a preferred embodiment, the first tarp has a first pole pocket 144 and a second pole pocket 146, each pole pocket running the length of the first tarp. The first and second pole pockets are essentially channels formed in the material of the first tarp and sized to receive the first and second tarp poles. The first tarp pole is received in the first pole pocket, and the second tarp pole is received in the second pole pocket. The first tarp is thus suspended between the first tarp pole and the second tarp pole.

Similarly, the second tarp has a third pole pocket 148 and a fourth pole pocket 150, each pole pocket running the length of the second tarp. The third and fourth pole pockets are essentially channels formed in the material of the second tarp and sized to receive the third and fourth tarp poles. The third tarp pole is received in the third pole pocket, and the fourth tarp pole is received in the fourth pole pocket. The second tarp is thus suspended between the third tarp pole and the fourth tarp pole.

In a preferred embodiment, a third tarp 152 and a fourth tarp 154 are provided. Like the first and second tarps 108 and 110, the third and fourth tarps are received on the tarp poles 100, 102, 104, and 106 and the tarp pole sleeves 82, 84, 116, and 132 near the support frame 12, and are positioned to cover the area between the tarp poles not covered by the first and second tarps. The third tarp may be secured to the first tarp and to the support frame 12 using laces or the like.

The produce catcher 2 preferably includes a first flange pole 156 and a substantially parallel second flange pole 158. The first flange pole is parallel to and substantially abuts the second tarp pole 102 along its entire length, and is attached to the support member 16 as shown in FIGS. 1 and 5–8. Similarly, the second flange pole is parallel to and substantially abuts the fourth tarp pole 106 along its entire length, and is attached to the support member 16 as shown in FIGS. 1 and 5–8. The first flange pole and the second flange pole are spaced apart from one another at a distance sufficient to allow the positioning of a trunk 168 of a tree 170 therebetween, as shown in FIG. 8.

In a preferred embodiment, the first flange pole 156 is removably received in the first flange pole sleeve 92, and is fitted with a first flange member 160 extending horizontally therefrom. The second flange pole 158 is removably received in the second flange pole sleeve 94, and is fitted with a second flange member 162 extending horizontally therefrom. Preferably, the first and second flange members extend the length of the flange poles, and meet or slightly overlap at a midpoint between the flange poles. In a preferred embodiment, the flange members are made from rubber or rubberized fabric. Other materials which are formable, resilient, and semi-rigid could also be used. The flange members are affixed to the flange poles using bolts, rivets or any other suitable means.

As shown in FIGS. 4A and 4B, the first tarp pole 100 and the third tarp pole 104 are removably securable in the first swiveling tarp pole sleeve 116 and the second swiveling tarp pole sleeve 132 respectively. A bolt 164 is provided for threading through a bolt hole 166 in each of the swiveling tarp pole sleeves. Each bolt is tightened until it presses on the tarp pole, thus holding the tarp pole in position.

The second tarp pole 102 and the fourth tarp pole 106 are removably securable in the first stationary tarp pole sleeve 82 and the second stationary tarp pole sleeve 84, respectively, as shown in FIG. 2. In a preferred embodiment, each bolt 90 is threaded through a bolt hole 88 and tightened until it presses on the tarp pole, thus holding the tarp pole in position. Similarly, the flange poles 156 and 158 are removably securable in the first flange pole sleeve 92 and the second flange pole sleeve 94 respectively. Each bolt 98 is threaded through a bolt hole 96 and tightened until it presses on the flange pole, thus holding the flange pole in position.

In an additional preferred embodiment (not shown), the tarp pole sleeves and the flange pole sleeves have a second bolt hole aligned with the first bolt hole. In this embodiment, the tarp poles and flange poles each have a pin receiving hole which aligns with the bolt holes. A pin or bolt is pushed through the first bolt hole, through the pin receiving hole, and out through the second bolt hole to secure the tarp pole or flange pole in place.

In use, the produce catcher 2 is moved and positioned with a typical forklift or a forklift attachment on a vehicle 4. The two forks 6 and 8 of the forklift or forklift attachment are inserted in the first end 74 of the first forklift sleeve 70 and the first end 78 of the second forklift sleeve 72, respectively, and the forks are advanced until they are fully received within the forklift sleeves.

The produce catcher 2 is capable of adjustment to a variety of positions. A typical use of the produce catcher includes the following positions: Fully retracted for empty transport; parallel extended for catching produce; partially retracted for loaded transport; and angled parallel for unloading.

Fully Retracted:

As shown in FIG. 7, when the produce catcher 10 is empty and being transported, the first extending arm 18 and the second extending arm 20 can be fully retracted into the first support member 14 and the second support member 16, respectively. This position provides the narrowest possible width, making the produce catcher more maneuverable between planting rows and on roads. When the produce catcher is in the fully retracted position, the tarps 108, 110, 152 and 154 are slack, and are suspended below the plane of the tarp poles 100, 102, 104, and 106.

Parallel Extended:

To use the produce catcher to catch produce, the operator must position the produce catcher 2 around the trunk 168 of the tree 170 being harvested, as shown in FIG. 8. This is accomplished by aligning the trunk of the tree between the ends of the first flange pole 156 and the second flange pole 158, and then advancing the produce catcher with the forklift or tractor so that the flange poles straddle the tree trunk. The first flange 160 and the second flange 162 are flexible and resilient, and so will give way to the tree trunk as the produce catcher is advanced, and then return to their horizontal position. The flanges form a seal between the flange poles. The produce catcher is in position when the trunk is about half way along the length of the flange poles.

Once positioned, the first extending arm 18 and the second extending arm 20 are extended, thus removing the slack from the tarps 108, 110, 152 and 154 and forming a platform. In this position, the tarps can receive produce 172 removed from the tree 170 by a tree shaker or other device (not shown).

Partially Retracted:

After the produce catcher 2 is loaded with produce 172 shaken from the tree 170, the extending arms 18 and 20 are partially retracted, causing the tarps 108, 110, 152 and 154 to take the form of a sling. The produce catcher is pulled away from the tree, and may be tilted back slightly with the forklift or forklift attachment 4 to prevent produce from rolling off the tarps. In this position, the produce is safely and gently cradled for transport to a conveyor belt, bin, or other destination.

Angled Parallel:

To unload the produce catcher 2 at its destination, the produce catcher is raised to an appropriate height by the forklift or forklift attachment 4. Then, the third hydraulic actuator 118 is retracted, causing the first tarp pole 100 to swivel inward to position 100' as indicated in dotted outline in FIG. 5. This change causes the tarp 108 sling to be narrower at its open end 174. Simultaneously or sequentially, the fourth hydraulic actuator 134 is retracted, causing the third tarp pole 104 to swivel inward to position 104'. This change causes the tarp 110 sling to be narrower at its open end 176. The first extending member 18 and the second extending member 20 may be extended at this point. The produce catcher is next tilted forward to discharge the produce out the open end of the tarps. After unloading, the produce catcher can be repositioned in preparation for the next use.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

What is claimed is:

1. A produce catcher comprising:
    a support frame including a support member, a first extending arm and a second extending arm, the first extending arm being substantially parallel to and extendible from the support member, and the second extending arm being substantially parallel to and extendible from the support member in a direction opposite and away from the extension of the first extending arm;
    a first tarp pole pivotally attached to the first extending arm;
    a second tarp pole affixed to the support member;
    a third tarp pole pivotally attached to the second extending arm;
    a fourth tarp pole affixed to the support member;
    the second tarp pole and the fourth tarp pole being spaced apart from one another at a distance sufficient to allow the positioning of a trunk of a tree therebetween;
    a first tarp adapted to be suspended between the first tarp pole and the second tarp pole; and
    a second tarp adapted to be suspended between the third tarp pole and the fourth tarp pole.

2. The produce catcher of claim 1, wherein the support member includes a first support member and a second support member.

3. The produce catcher of claim 1, further including a pair of fork receiving sleeves positioned in the horizontal plane perpendicular to the support member, the fork receiving sleeves for receiving the forks of a forklift.

4. The produce catcher of claim 1, further including
    a first flange pole extending perpendicularly from the support member, the first flange pole having a first flange extending horizontally therefrom,
    a second flange pole extending perpendicularly from the support member, the second flange pole having a second flange extending horizontally therefrom;
    the first flange pole and the second flange pole positioned between the second tarp pole and the fourth tarp pole; and
    the first flange and the second flange meeting at a midpoint between the first flange pole and the second flange pole to form a seal.

5. The produce catcher of claim 1, further including a first hydraulic actuator positioned on the support frame for extending and retracting the first extending arm relative to the support member.

6. The produce catcher of claim 1, further including a second hydraulic actuator positioned on the support frame for extending and retracting the second extending arm relative to the support member.

7. The produce catcher of claim 1, further including a third hydraulic actuator mounted on the first extending arm for pivotally moving the first tarp pole.

8. The produce catcher of claim 1, further including a fourth hydraulic actuator mounted on the second extending arm for pivotally moving the third tarp pole.

9. A produce catcher comprising:
    support frame including a support members a first extending arm and a second extending arm, the first extending arm being substantially parallel to and extendible from the support member, and the second extending arm being substantially parallel to and extendible from the support member in a direction opposite and away from the extension of the first extending arm;
    a first tarp pole pivotally attached to the first extending arm, and extending substantially perpendicularly therefrom;
    a second tarp pole affixed to the support member and extending substantially perpendicularly;
    a third tarp pole pivotally attached to the second extending arm, and extending substantially perpendicularly therefrom;
    a fourth tarp pole affixed to the support member, and extending substantially perpendicularly therefrom;
    the first, second, third and fourth tarp poles substantially parallel to one another, and the second tarp pole and the fourth tarp pole being spaced apart from one another at a distance sufficient to allow the positioning of a trunk of a tree therebetween;
    a first tarp adapted to be suspended between the first tarp pole, and the second tarp pole; and
    a second tarp adapted to be suspended between the third tarp pole and the fourth tarp pole.

10. The produce catcher of claim 9, further including a pair of fork receiving sleeves positioned in the horizontal plane perpendicular to the support member, the fork receiving sleeves for receiving the forks of a forklift.

11. The produce catcher of claim 9, further including
   a first flange pole extending perpendicularly from the support member, the first flange pole having a first flange extending horizontally therefrom;
   a second flange pole extending perpendicularly from the support member, the second flange pole having a second flange extending horizontally therefrom;
   the first flange pole and the second flange pole positioned between the second tarp pole and the fourth tarp pole; and
   the first flange and the second flange meeting at a midpoint between the first flange pole and the second flange pole to form a seal.

12. The produce catcher of claim 9, wherein the support member includes a first support member and a second support member.

13. The produce catcher of claim 9, further including a first hydraulic actuator positioned on the support frame for extending and retracting the first extending arm relative to the support member.

14. The produce catcher of claim 9, further including a second hydraulic actuator positioned on the support frame for extending and retracting the second extending arm relative to the support member.

15. The produce catcher of claim 9, further including a third hydraulic actuator mounted on the first extending arm for pivotally moving the first tarp pole.

16. The produce catcher of claim 9, further including a fourth hydraulic actuator mounted on the second extending arm for pivotally moving the third tarp pole.

17. A method for collecting produce from a tree, the method including the steps of:
   positioning a produce catcher under the tree, the produce catcher having a first tarp suspended from a first tarp pole and a second tarp pole, the first tarp pole attached to a first extending arm, and the second tarp pole attached to a support member, the first and second tarp poles positioned on a first side of the tree trunk, and a second tarp suspended from a third tarp pole and a fourth tarp pole, the third tarp pole attached to a second extending arm, and the fourth tarp pole attached to the support member, the tarp poles substantially parallel, the third and fourth tarp poles positioned on a second, opposite side of the tree trunk, and the extending arms in a fully retracted position;
   extending the first extending arm to remove the slack from the first tarp; and
   extending the second extending arm to remove the slack from the second tarp.

18. The method of claim 17, further including the steps of:
   causing produce to drop from the tree onto the first tarp and the second tarp;
   partially retracting the first extending arm to form a sling with the first tarp; and
   partially retracting the second extending arm to form a sling with the second tarp.

* * * * *

UNITED STATES PATENT AND TRADEMARK OFFICE
CERTIFICATE OF CORRECTION

PATENT NO.   : 6,282,878B1
DATED        : September 4, 2001
INVENTOR(S)  : Daryl G. Hill It is certified that error appears in the above-identified patent and that said Letters Patent is hereby corrected as shown below:

Column 8, claim 9,
Line 41, replace "members" with -- member, --;
Line 51, insert a comma after "member"; and
Line 52, after "perpendicularly" insert -- therefrom --.

Signed and Sealed this

Twelfth Day of March, 2002

Attest:

Attesting Officer

JAMES E. ROGAN
Director of the United States Patent and Trademark Office